(12) United States Patent
Jansen et al.

(10) Patent No.: US 8,513,343 B2
(45) Date of Patent: *Aug. 20, 2013

(54) UNSATURATED POLYESTER RESIN COMPOSITIONS

(75) Inventors: Johan Franz Gradus Antonius Jansen, Geleen (NL); Ronald Ivo Kraeger, Baarn (NL)

(73) Assignee: DSM IP Assets B.V., Heerlen (NL)

( * ) Notice: Subject to any disclaimer, the term of this patent is extended or adjusted under 35 U.S.C. 154(b) by 53 days.

This patent is subject to a terminal disclaimer.

(21) Appl. No.: 12/307,395

(22) PCT Filed: Jul. 5, 2007

(86) PCT No.: PCT/EP2007/005960
§ 371 (c)(1),
(2), (4) Date: Nov. 2, 2009

(87) PCT Pub. No.: WO2008/003495
PCT Pub. Date: Jan. 10, 2008

(65) Prior Publication Data
US 2010/0069549 A1    Mar. 18, 2010

(30) Foreign Application Priority Data

Jul. 6, 2006 (EP) ..................... 06014008

(51) Int. Cl.
*C08K 5/04*    (2006.01)
*C08G 18/42*    (2006.01)
*C08L 33/04*    (2006.01)

(52) U.S. Cl.
USPC ............... 524/394; 524/604; 525/15; 525/16; 525/17; 525/41; 428/36; 428/91

(58) Field of Classification Search
USPC ................ 523/456; 525/168, 10, 15, 16–17, 525/41, 43, 451; 524/82, 86, 115, 86.115, 524/394, 604; 428/35.7, 36, 91
See application file for complete search history.

(56) References Cited

U.S. PATENT DOCUMENTS 5,235,010 A    8/1993  Giovando
7,208,539 B2*  4/2007  Tsuchikawa et al. ......... 524/415

FOREIGN PATENT DOCUMENTS

EP    1 705 215    9/2006

OTHER PUBLICATIONS

International Search Report for PCT/EP2007/005960 mailed Oct. 25, 2007.
Written Opinion for PCT/EP2007/005960 mailed Oct. 25, 2007.
Database WPI Week 197723, *Derwent Publications*, 1977-40550Y, XP002454888.
Malik, J.M.S.—Rev. Macromol. Chem. Phys., C40(2&3), 139-165 (2000).
Polyester Resins, Unsaturated, VCH Verlag GmbH & Co., pp. 1-10 (2005).
Science Direct, Desalination 206 pp. 300-310 (2007).
Journal of the American Chemical Society, vol. 54, No. 9 (Sep. 1932).

* cited by examiner

*Primary Examiner* — Hannah Pak
(74) *Attorney, Agent, or Firm* — Nixon & Vanderhye P.C.

(57) ABSTRACT

The present invention relates to unsaturated polyester resin composition comprising an unsaturated polyester resin, a manganese compound, a 1,3-dioxo compound and a base; the molar ratio between the dioxo compound and the basic functionality of the base is from 170:1 to 1:30 and the resin composition being curable with a peroxide. The present invention further relates to a process for radically curing such a resin composition wherein a peroxide is added to the resin composition and the curing is effected in the absence of cobalt.

21 Claims, No Drawings

UNSATURATED POLYESTER RESIN COMPOSITIONS

This application is the U.S. national phase of International Application No. PCT/EP2007/005960 filed 5 Jul. 2007 which designated the U.S. and claims priority to European Patent Application No. 06014008.4 filed 6 Jul. 2006, the entire contents of each of which are hereby incorporated by reference.

The present invention relates to unsaturated polyester resin compositions that are curable with a peroxide component and that are showing a reduced gel-time drift tendency.

The present invention further also relates to objects and structural parts prepared from such unsaturated polyester resin compositions by curing with a peroxide. The present invention finally also relates to methods of peroxide curing of unsaturated polyester resin compositions.

As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For unsaturated polyester resins, as can generally be cured under the influence of peroxides, gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. The lower the gel-time drift is, the better predictable the behavior of the resin (and the resulting properties of the cured material) will be.

W. D. Cook et al. in Polym. Int. Vol. 50, 2001, at pages 129-134 describe in an interesting article various aspects of control of gel time and exotherm behavior during cure of unsaturated polyester resins. They also demonstrate how the exotherm behavior during cure of such resins can be followed. FIGS. 2 and 3 of this article show the gel times in the bottom parts of the exotherms measured. Because these authors focus on the exotherms as a whole, they also introduced some correction of the exotherms for heat loss. As can be seen from the figures, however, such correction for heat loss is not relevant for gel times below 100 minutes.

Gel time drift (hereinafter: "Gtd") can be expressed in a formula as follows:

$$Gtd = (T_{25 \to 35° C. \text{ at } y\text{-days}} - T_{25-35° C. \text{ after mixing}}) / T_{25 \to 35° C. \text{ after mixing}} \times 100\% \quad \text{(formula 1)}$$

In this formula $T_{25 \to 35° C.}$ (which also might be represented by $T_{gel}$) represents, as mentioned above, the time lapsed in the curing phase of the resin to increase in temperature from 25° C. to 35° C. The additional reference to "at y days" shows after how many days of preparing the resin the curing is effected.

All polyester resins, by their nature, undergo some changes over time from their production till their actual curing. One of the characteristics where such changes become visible is the gel-time drift. The state of the art unsaturated polyester resin systems generally are being cured by means of initiation systems. In general, such unsaturated polyester resin systems are cured under the influence of peroxides and are accelerated (often even pre-accelerated) by the presence of metal compounds, especially cobalt salts, as accelerators. Cobalt naphthenate and cobalt octanoate are the most widely used accelerators. In addition to accelerators, the polyester resins usually also contain radical inhibitors for ensuring that the resin systems do not gellify prematurely (i.e. that they have a good storage stability). Furthermore, radical inhibitors are being used to ensure that the resin systems have an appropriate gel time and/or for adjusting the gel-time value of the resin system to an even more suitable value.

Most commonly, in the state of the art, polymerization initiation of unsaturated polyester resins, etc. by redox reactions involving peroxides, is accelerated or pre-accelerated by a cobalt compound in combination with another accelerator. Reference, for instance, can be made to U.S. Pat. No. 3,584,076, wherein dioxo-compounds chosen from the group of enolisable ketones are used as co-accelerators.

An excellent review article of M. Malik et al. in J.M.S.—Rev. Macromol. Chem. Phys., C40(2&3), p. 139-165 (2000) gives a good overview of the current status of resin systems. Curing is addressed in chapter 9. For discussion of control of gel time reference can be made to the article of Cook et al. as has been mentioned above. Said article, however, does not present any hint as to the problems of gel-time drift as are being solved according to the present invention.

The phenomenon of gel-time drift, indeed, so far got quite little attention in the literature. Most attention so far has been given in literature to aspects of acceleration of gel time in general, and to improving of pot-life or shelf life of resins. The latter aspects, however, are not necessarily correlated to aspects of gel-time drift, and so, the literature until now gives very little suggestions as to possible solutions for improvement of (i.e. lowering of) gel-time drift. For instance, reference can be made to a paper presented by M. Belford et al., at the Fire Retardant Chemicals Association Spring Conference, Mar. 10-13, 2002 where the gel-time reducing effect of a new antimony pentoxide dispersion (NYACOL APE 3040) has been addressed in fire retardant polyester resins promoted with cobalt.

Accordingly, for the unsaturated polyester resins as are part of the current state of the art there is still need for finding resin systems showing reduced gel-time drift, or in other words, resin systems having only slight gel-time drift when cured with a peroxide. Preferably the mechanical properties of the resin composition after curing with a peroxide are unaffected (or improved) as a result of the changes in the resin composition for achieving the reduced gel-time drift. Moreover, for environmental reasons, the presence of cobalt in the resins is less preferred.

The present inventors now, surprisingly, found that unsaturated polyester resin systems with good cure characteristics when cured with a peroxide, could be obtained by providing unsaturated polyester resin compositions comprising an unsaturated polyester resin, a manganese compound, a 1,3-dioxo compound and a base, wherein the molar ratio between the dioxo compound and the basic functionality of the base is from 170:1 to 1:30.

According to the present invention the aforementioned problems of the prior art have been overcome and resin compositions having good cure characteristics are obtained, i.e. the resin compositions according to the invention have short gel time, short peak time and/or high peak temperature. In the curing of unsaturated polyester resins, gel time is a very important characteristic of the curing properties. In addition also the time from reaching the gel time to reaching peak temperature, and the level of the peak temperature (higher peak temperature generally results in better curing) are important. In addition, the resin composition according to the invention only shows slight gel-time drift when cured with a peroxide. Furthermore, in view of the brown colour of manganese compounds an unexpected advantage of the invention is that the objects obtained by curing the resin compositions of the invention are almost colorless. Even more surprisingly the present inventors have found that using the resin compositions according to the invention in the preparation of cured objects results in cured objects with a very low rest styrene and/or benzaldehyde content.

GB-1376615 describes a two-component composition reactable to a resin composition on mixing of the two components in which the components are stored separately and are mixed at the time of use; the first component comprises an acrylic or methacrylic ester as a main base and a metal chelate compound; the second component comprising an acrylic or methacrylic ester and a peroxide which by itself does not cause the acrylic or methacrylic ester to harden at room temperature. The main base may further be provided with a hardening accelerator, for example, NN'-dimethylformamide, amines such as triethylamine and tri-n-butylamine, carboxylic acids and carboxylic anhydrides. The metal chelate compound is a β-diketone chelate or ketoester chelate of copper, zinc, aluminium, titanium, vanadium, chromium, manganese, iron, cobalt or nickel. In Example 4, 50 parts of trimethylol propane trimethacrylate, 50 parts of glycidyl methacrylate, 0.4 part Mn(II)acetylacetonate and 1 part of triethylamine (component A-4) are mixed with component B-1 consisting of 0.05 part of p-benzoquinone, 5 parts of cumene hydroperoxide in 100 parts of tetraethylene glycol dimethacrylate. This document does not relate to unsaturated polyester resins. Furthermore, the resin composition as described in this document does not comprise a β-diketone compound as such.

WO-A-9012825 discloses an accelerator composition for the curing of unsaturated polyester resins comprising a complex of a salt of at least one metal selected from the group consisting of lithium, magnesium, manganese, copper, cobalt, vanadium and iron, and an organic oxygen-containing compound capable of forming a metal complex with said metal salt including at least one functional group selected from the group consisting of an aldehyde, ketone, ether, ester or alcohol group. There is no indication in this reference that acceleration can also be achieved with a manganese compound, a 1,3-dioxo compound and a base. On the contrary, this reference teaches that adding manganese acetate (example 12) to an accelerator comprising lithium chloride and a β-diketone (example 11) results in an increased gel time, i.e. that Mn acts as a retarder.

The unsaturated polyester as is comprised in the unsaturated polyester resin compositions according to the present invention, may suitably be selected from the unsaturated polyester resins as are known to the skilled man. Examples of suitable unsaturated polyester resins to be used as basic resin systems in the resins of the present invention are, subdivided in the categories as classified by Malik et al., cited above.

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

Besides these classes of resins also so-called dicyclopentadiene (DCPD) resins can be distinguished as unsaturated polyester resins.

All of these resins, as can suitably be used in the context of the present invention, may be modified according to methods known to the skilled man, e.g. for achieving lower acid number, hydroxyl number or anhydride number, or for becoming more flexible due to insertion of flexible units in the backbone, etc. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Of course, also other reactive groups curable by reaction with peroxides may be present in the resins, for instance reactive groups derived from itaconic acid, citraconic acid and allylic groups, etc. Accordingly, the unsaturated polyester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The unsaturated polyester resins as are being used in the context of the present invention may be any type of such resins, but preferably are chosen from the group of DCPD-resins, iso-phthalic resins and ortho-phthalic resins. More detailed examples of resins belonging to such groups of resins have been shown in the foregoing part of the specification.

The resin composition according to the present invention generally contains less than 5 wt. % water.

The resin composition according to the invention preferably has an acid value in the range of from 0.001-300 mg KOH/g of resin composition. As used herein, the acid value of the resin composition is determined titrimetrically according to ISO 2114-2000. Preferably, the molecular weight of the unsaturated polyester resin is in the range of from 500 to 200.000 g/mole. As used herein, the molecular weight of the resin is determined using gel permeation chromatography according to ISO 13885-1.

In the context of the invention all kinds of manganese compounds can be used. According to the invention, the manganese compound present in the resin composition is preferably a manganese salt or complex. More preferably, the manganese compound is a manganese$^{2+}$ salt or complex or a manganese$^{3+}$ salt or complex. Even more preferably, the manganese compound is a manganese$^{2+}$ salt or manganese$^{3+}$ salt. The manganese$^{2+}$ salt is preferably an organic manganese$^{2+}$ salt.

The manganese salt is preferably an organic manganese$^{3+}$ salt. The organic manganese$^{2+}$ salt or the organic manganese$^{3+}$ salt is preferably a manganese carboxylate or a manganese acetoacetate. It will be clear that, instead of a single manganese compound also a mixture of manganese compounds can be used.

The manganese compound is preferably present in the resin composition according to the invention in an amount of at least 0.01 mmol manganese per kg of primary resin system, more preferably in an amount of at least 0.03 mmol manganese per kg of primary resin system. The upper limit of the manganese content is not very critical, although for reasons of cost efficiency of course no extremely high concentrations will be applied. Generally the concentration of the manganese compound in the primary resin system will be lower than 30 mmol manganese per kg of primary resin system.

For understanding of the invention, and for proper assessment of the amounts of manganese compound to be present in the resin composition, the term "primary resin system" as used herein is understood to mean the total weight of the resin, but excluding any fillers as may be used when applying the resin system for its intended uses. The primary resin system therefore consists of the unsaturated polyester resin, any additives present therein (except for the peroxide component that is to be added shortly before the curing) soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide (titanium white)), flame retardants, e.g. aluminium oxide hydrates, etc.

The 1,3-dioxo compound is preferably a compound having the following formula:

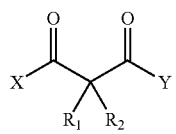

(1)

whereby
X,Y=H, $C_1$-$C_{20}$ alkyl, $C_6$-$C_{20}$ aryl, alkylaryl, arylalkyl, part of a polymer chain, $OR^3$, $NR^3R^4$;
$R^1$, $R^2$, $R^3$, and $R^4$ each individually may represent hydrogen (H), or a $C_1$-$C_{20}$ alkyl, aryl, alkylaryl or arylalkyl group, that each optionally may contain one or more hetero-atoms (e.g. oxygen, phosphor, nitrogen or sulphur atoms) and/or substituents;
a ring may be present between $R^1$ and $R^2$, $R^1$ and $R^3$, and/or between $R^2$ and $R^4$;
$R^3$ and/or $R^4$ may be part of a polymer chain, may be attached to a polymer chain or may contain a polymerizable group. Preferably, X and/or Y are/is $C_1$-$C_{20}$ alkyl and/or $C_1$-$C_{20}$ aryl. More preferably, X and/or Y are/is a methyl group. Preferably, the 1,3-dioxo compound is acetylacetone. The 1,3-dioxo compound may be a polymer or is polymerizable.

Preferably, the amount of the 1,3-dioxo compound is from 0.05 to 5% by weight, calculated on the total weight of the primary resin system of the resin composition. More preferably, amount of the 1,3-dioxo compound is from 0.5 to 2% by weight.

Preferably, the base present in the resin composition according to the present invention is an organic base with $pK_a \geq 10$ or the base is an alkali metal or earth alkali metal compound. More preferably, the base is an alkali metal or earth alkali metal compound. The organic base with $pK_a \geq 10$ is preferably a nitrogen containing compound, preferably an amine, more preferably a tertiary amine. The alkali metal or earth alkali metal compound is preferably an oxide, hydroxide, carboxylate, carbonate or hydrocarbonate. Preferably, the alkali metal is not lithium and the earth alkali metal is not magnesium in view of the low solubility of lithium and magnesium compounds in the resin composition. Most preferably, the base is a potassium compound. The potassium compound is preferably a potassium carboxylate, preferably a potassium $C_6$-$C_{20}$ carboxylate. In a preferred embodiment of the present invention, the potassium $C_6$-$C_{20}$ carboxylate is in-situ formed by adding potassium hydroxide to the resin composition.

Preferably, the amount of the base is from 0.001 to 2000 mmol/kg of primary resin system. More preferably, the amount of the base is from 3 to 150 mmol/kg of primary resin system.

In the resin composition according to the present invention, the molar ratio between the manganese and the basic functionality of the base is preferably from 3:1 to 1:1500, preferably 1:5 to 1:60. The molar ratio between the dioxo-compound and the basic functionality of the base is preferably from 13:1 to 1:3. The molar ratio between the manganese and the dioxo compound is preferably from 2:1 to 1:5000, preferably 1:3 to 1:400.

These resins all can be cured by means of peroxide curing. The peroxides used for the initiation can be any peroxide known to the skilled man for being used in curing of unsaturated polyester resins. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. The peroxides can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide, methyl isobutylketone peroxide and acetylacetone peroxide), peroxyesters or peracids (such as, for instance, t-butyl peresters, benzoyl peroxide, peracetates and perbenzoates, lauryl peroxide, including (di)peroxyesters), -perethers (such as, for instance, peroxy diethyl ether). Often the organic peroxides used as curing agent are tertiary peresters- or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule). In case a solid peroxide is being used for the curing, the peroxide is preferably benzoyl peroxide (BPO).

Most preferably, however, the peroxide is a liquid hydroperoxide. The liquid hydroperoxide, of course, also may be a mixture of hydroperoxides. Handling of liquid hydroperoxides when curing the resins for their final use is generally easier: they have better mixing properties and dissolve more quickly in the resin to be cured.

In particular it is preferred that the peroxide is selected from the group of ketone peroxides, a special class of hydroperoxides. The peroxide being most preferred in terms of handling properties and economics is methyl ethyl ketone peroxide (MEK peroxide).

In a preferred embodiment of the invention, the resin composition according to the invention also contains one or more reactive diluents, preferably in an amount greater than 5 weight %.

Such reactive diluents are especially relevant for reducing the viscosity of the resin in order to improve the resin handling properties, particularly for being used in techniques like vacuum injection, etc. However, the amount of such reactive diluent in the resin composition according to the invention is not critical. Preferably, the reactive diluent is a methacrylate and/or styrene.

In a further preferred embodiment of the present invention, the resin composition also contains one or more radical inhibitors.

More preferably, the resin compositions according to the invention contain one or more radical inhibitors, preferably chosen from the group of phenolic compounds, stable radicals like galvinoxyl and N-oxyl based compounds, catechols and/or phenothiazines.

The amount of radical inhibitor as used in the context of the present invention, may, however, vary within rather wide ranges, and may be chosen as a first indication of the gel time as is desired to be achieved. Preferably, the amount of phenolic inhibitor is from about 0.001 to 35 mmol per kg of primary resin system, and more preferably it amounts to more than 0.01, most preferably more than 0.1 mmol per kg of primary resin system. The skilled man quite easily can assess, in dependence of the type of inhibitor selected, which amount thereof leads to good results according to the invention.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2, 6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

Advantageously, the amount of radical inhibitor in the resin composition according to the invention is in the range of from 0.0001 to 10% by weight, calculated on the total weight of the primary resin system of the resin composition. More preferably, the amount of inhibitor in the resin composition is in the range of from 0.001 to 1% by weight.

In specifically preferred embodiments of the invention the resin composition is essentially free of cobalt. Essentially free of cobalt means that the cobalt concentration is lower than 0.01 mmol Co per kg primary resin system, preferably lower than 0.001 mmol Co per kg primary resin system. Most preferably the resin composition is free of cobalt.

The unsaturated polyester resin composition according to the present invention can be applied in all applications as are usual for such types of resins. In particular they can suitably used in closed mould applications, but they also can be applied in open mould applications. For closed mould applications it is especially important that the manufacturer of the closed mould products reliably can use the favorable (i.e. reduced) gel-time drift tendency of the resin compositions according to the invention. End segments where the unsaturated polyester resin compositions according to the present invention can be applied are also marine applications, chemical anchoring, roofing, construction, relining, pipes & tanks, flooring, windmill blades, etc. That is to say, the resin compositions according to the invention can be used in all known uses of unsaturated polyester resins.

The present invention further also relates to all such objects or structural parts as are being obtained when curing the unsaturated polyester resin compositions according to the invention with a peroxide. These objects and structural parts have excellent mechanical properties.

The present invention further also relates to a process for radically curing a resin composition according to the invention by adding a peroxide to the resin composition and by effecting the curing in the absence of cobalt. It has surprisingly been found that the combination of the manganese compound, the 1,3-dioxo compound and the base accelerates the radically curing of the unsaturated polyester with the peroxide. Preferably, the curing is effected at a temperature in the range of from −20 to +200° C., preferably in the range of from −20 to +100° C., and most preferably in the range of from −10 to +60° C. (so-called cold curing). In a preferred embodiment the curing is effected essentially free of cobalt.

The invention is now demonstrated by means of a series of examples and comparative examples. All examples are supportive of the scope of claims. The invention, however, is not restricted to the specific embodiments as shown in the examples.

EXPERIMENTAL PART

The resins used for curing are commercially available products from DSM Composite Resins B.V., Schaffhausen, Switzerland (unless indicated otherwise), and in addition thereto also a resin—hereinafter referred to as Resin A—was specifically prepared on behalf of the inventors for being used in the tests.

Preparation of Resin A 184.8 g of propylene glycol (PG), 135.8 g of diethylene glycol (DEG), 216.1 g of phthalic anhydride (PAN), 172.8 g of maleic anhydride (MAN), and 0.075 g 2-t-butylhydroquinone were charged in a vessel equipped with a reflux condenser, a temperature measurement device and inert gas inlet. The mixture was heated slowly by usual methods to 205° C. At 205° C. the mixture was kept under reduced pressure until the acid value reached a value below 16 mg KOH/g resin and the falling ball viscosity at 100° C. was below 50 dPa·s. Then the vacuum was relieved with inert gas, and the mixture was cooled down to 130° C., and thereafter the solid UP resin so obtained was transferred to a mixture of 355 g of styrene and 0.07 g of mono-t-butyl-hydroquinone and was dissolved at a temperature below 80° C. The final resin viscosity reached at 23° C. was 640 mPa·s, and the Non Volatile Matter content was 64.5 wt. %.

Monitoring of Curing

In most of the Examples and Comparative Examples presented hereinafter it is mentioned, that curing was monitored by means of standard gel time equipment. This is intended to mean that both the gel time ($T_{gel}$ or $T_{25 \to 35° C.}$) and peak time ($T_{peak}$ or $T_{25 \to peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

For some of the Examples and Comparative Examples also the gel-time drift (Gtd) was calculated. This was done on the basis of the gel times determined at different dates of curing according to formula 1:

$$Gtd = (T_{25 \to 35° C. \ at\ y\text{-}days} - T_{25 \to 35° C. \ after\ mixing}) / T_{25 \to 35° C. \ after\ mixing} \times 100\% \quad \text{(formula 1)}$$

with "y" indicating the number of days after mixing.

Examples 1a and 1b and Comparative Experiments a-f

Example 1a

To a mixture of 450 g resin A and 50 g styrene was added 0.0633 g 0.5 mmol Mn/kg primary resin) Mn(acac)$_2$. This mixture was divided in 4 portions of 100 g each, which were cured at 25° C. using acetyl acetone as 1,3-dioxo compound, triethyl amine as base and 3% (relative to primary resin system) Butanox M-50 (a MEK peroxide solution, commercially available from Akzo Nobel Chemicals Inc.) as peroxide. The curing was monitored with the gel time equipment.

Example 1b

Simultaneously also a mixture of 450 g resin A, 50 g styrene and 0.2289 (0.5 mmol Mn/kg primary resin) of a Mn ethylhexanoate solution (6% Mn metal) was prepared and divided into 4 portions of 100 g each, which were cured using acetyl acetone as 1,3-dioxo compound, triethyl amine as base and 3% (relative to primary resin system) Butanox M-50 as peroxide. The curing was monitored with the gel time equipment. The results are shown in the Table 1.

TABLE 1

|  | Mn compound | 1,3-dioxo compound (%) | base (%) | gel time (min) |
| --- | --- | --- | --- | --- |
| Example 1a | Mn(acac)$_2$ | 1 | 1 | 8.8 |
| Example 1b | Mn ethyl hexanoate | 1 | 1 | 3.6 |
| Comp. Exp. A | Mn(acac)$_2$ | 0 | 0 | >60 |
| Comp. Exp. B | Mn(acac)$_2$ | 1 | 0 | >60 |
| Comp. Exp. C | Mn(acac)$_2$ | 0 | 1 | >60 |
| Comp. Exp. D | Mn ethyl hexanoate | 0 | 0 | >60 |
| Comp. Exp. E | Mn ethyl hexanoate | 1 | 0 | >60 |
| Comp. Exp. F | Mn ethyl hexanoate | 0 | 1 | >60 |

These examples and the comparative experiments clearly demonstrate that an efficient curing according to the invention only takes place when both a base as well as a 1,3-dioxo compound are present.

Examples 2a-g

Several formulations were prepared using 90 g resin A, 10 g styrene, 1 g acetyl acetone and 0.0915 g (1 mmol Mn/kg primary resin) Mn ethylhexanoate solution. To these formulations 1.6 mmol of different bases were added. The formulations were stirred for 5 min after which the curing using 3% (relative to primary resin system) Butanox M-50 was monitored in the gel timer. The results are shown in table 2.

TABLE 2

| Example | Base* | $T_{gel}$ (min) | $T_{peak}$ (min) | peak temp (° C.) |
| --- | --- | --- | --- | --- |
| 2a | K octanoate | 3 | 7 | 198 |
| 2b | Li neodecanoate | 20 | 36 | 162 |
| 2c | KOH | 15 | 23 | 187 |
| 2d | LiOH | 19 | 37 | 155 |
| 2e | (Bu)$_4$NOH | 24 | 35 | 178 |
| 2f | dimethyl ethanol amine | 13 | 23 | 182 |
| 2g | Diazabicycloundecene (DBU) | 12 | 20 | 189 |

*K octanoate employed as solution in polyethylene glycol; Li neodecanoate as solution in spirits; KOH, LiOH and (Bu)$_4$NOH as watery solutions.

These results indicate that both organic as well as inorganic bases can be used. Moreover these results indicate that curing can be tuned with the selection of base.

Examples 3a-l

Several formulations were prepared using 90 g resin A, 10 g styrene, 1 g K octanoate solution in PEG (polyethyleneglycol) and 0.915 g (1 mmol Mn/kg primary resin) Mn ethylhexanoate solution. To these formulations 1% of different 1,3-dioxo compounds were added. The formulations were stirred for 5 min after which the curing using 3% (relative to primary resin system) Butanox M-50 was monitored in the gel timer. The results are shown in table 3.

TABLE 3

| Example | 1,3-dioxo | $T_{gel}$ (min) | $T_{peak}$ (min) | Peak temp (° C.) |
| --- | --- | --- | --- | --- |
| 3a | Acetylacetone | 3.2 | 7.4 | 196 |
| 3b | Ethylacetoacetate | 76 | 86 | 175 |
| 3c | Ethylacetoacetoxy methacrylate | 121 | 132 | 177 |
| 3d | phenyl-1,3-butanedione | 6.5 | 12.3 | 193 |
| 3e | 1,3-diphenyl propane dione | 23 | 29 | 187 |
| 3f | dimethyl malonate | 73 | 83 | 178 |
| 3g | N,N-diethyl acetoacetamine | 110 | 120 | 177 |
| 3h | 2-acetyl-1,3-indanedione | 16 | 23 | 187 |
| 3i | triacetyl methane | 25 | 30 | 195 |

These results indicate that the cure can be tuned using different 1,3-dioxo compounds. Moreover, these results indicate that 1,3-dioxo compounds with keto groups are relatively active of which the 1,3-diketones are the most active 1,3-dioxo compounds.

Examples 4a-j and Comparative Experiment G

Several formulations were prepared using 90 g resin A, 10 g styrene, 1 g K octanoate solution in PEG and 1% acetylacetone and various amounts of Mn ethylhexanoate solution. The formulations were stirred for 5 min after which the curing using 3% (relative to primary resin system) Butanox M-50 was monitored in the gel timer. The results are shown in table 4.

TABLE 4

| | Mn (mmol/kg primary resin) | $T_{gel}$ (min) | $T_{peak}$ (min) | Peak temp (° C.) |
|---|---|---|---|---|
| Comp. Exp G | 0 | | 865 | 28 |
| Example 4a | 0.02 | 11.1 | 38.5 | 54 |
| Example 4b | 0.03 | 9.7 | 42.1 | 99 |
| Example 4c | 0.07 | 6.8 | 25.1 | 143 |
| Example 4d | 0.17 | 4.5 | 14.2 | 181 |
| Example 4e | 0.33 | 4.2 | 11 | 190 |
| Example 4f | 0.5 | 3.5 | 8.6 | 195 |
| Example 4g | 1 | 3.2 | 7.4 | 195 |
| Example 4h | 1.67 | 3.4 | 6.9 | 199 |
| Example 4i | 3.33 | 3.1 | 5.9 | 202 |
| Example 4j | 6.67 | 6 | 8.3 | 203 |

The results indicate that for a good curing which results in a peak temperature>100° C. the amount of Mn metal should be above 0.03 mmol/kg resin.

Examples 5a-m

Several formulations were prepared using 90 g resin A, 10 g styrene, 0.5 g K octanoate solution in PEG, various amounts of acetylacetone and 0.0458 g Mn ethylhexanoate solution (0.5 mmol Mn/kg primary resin). The formulations were stirred for 5 min after which the curing using 3% (relative to primary resin system) Butanox M-50 was monitored in the gel timer. The results are shown in table 5.

TABLE 5

| Example | % acetylacetone | Tgel (min) | T peak (min) | peak temp (° C.) |
|---|---|---|---|---|
| 5a | 0.1 | 41.2 | 57.3 | 154 |
| 5b | 0.2 | 29.4 | 43.8 | 166 |
| 5c | 0.3 | 24.9 | 38.1 | 169 |
| 5d | 0.4 | 21.5 | 30.8 | 184 |
| 5e | 0.5 | 19.6 | 28.7 | 184 |
| 5f | 0.6 | 17.9 | 26.9 | 184 |
| 5g | 0.7 | 16 | 25 | 183 |
| 5h | 0.8 | 15 | 23.8 | 185 |
| 5i | 0.9 | 14.7 | 23.4 | 185 |
| 5j | 1 | 7.6 | 15.1 | 187 |
| 5k | 2 | 6.5 | 13 | 189 |
| 5l | 5 | 5.8 | 11.1 | 188 |
| 5m | 10 | 6 | 11.2 | 175 |

These results indicate the cure profile can be tuned using various amounts of 1,3-dioxo compounds Examples 6a-h Several formulations were prepared using 90 g resin A, 10 g styrene, variable amounts of K octanoate solution in PEG, 1% acetylacetone and 0.0.09 g Mn ethylhexanoate solution (1 mmol Mn/kg primary resin). The formulations were stirred for 5 min after which the curing using 3% (relative to primary resin system) Butanox M-50 was monitored in the gel timer. The results are shown in table 6.

TABLE 6

| Example | % K-oct solution | Tgel (min) | T peak (min) | peak temp (° C.) |
|---|---|---|---|---|
| 6a | 0.05 | 15.9 | 25.9 | 177 |
| 6b | 0.1 | 14.8 | 24.5 | 179 |
| 6c | 0.2 | 9.4 | 16.8 | 184 |
| 6d | 0.5 | 5.9 | 11.6 | 194 |
| 6e | 1 | 3.3 | 7.7 | 196 |
| 6f | 1.5 | 2.2 | 6 | 197 |
| 6g | 2 | 1.6 | 5.2 | 197 |
| 6h | 5 | 1 | 3.8 | 195 |

These results indicate the cure profile can be tuned using various amounts of base.

Examples 7a-g

A formulation was prepared using 450 g resin A, 50 g styrene, 2.5 g acetylacetone, 1 g K octanoate solution and 0.229 g Mn ethylhexanoate solution. This formulation was divided into 50 g portions, of which the cure was monitored in the gel timer using various amounts of peroxide. The results are shown in table 7.

TABLE 7

| Example | % Butanox M50 (relative to primary resin system) | Tgel (min) | T peak (min) | peak temp (° C.) |
|---|---|---|---|---|
| 7a | 0.25 | 181 | 214 | 118 |
| 7b | 0.5 | 74 | 94 | 147 |
| 7c | 1 | 41 | 57 | 154 |
| 7d | 1.5 | 29 | 44 | 166 |
| 7e | 2 | 25 | 38 | 169 |
| 7f | 2.5 | 21 | 33 | 174 |
| 7g | 3 | 19 | 31 | 175 |

These results indicate that even with low amounts of peroxide an efficient curing can take place. Furthermore these results indicate that the curing profile can be tuned using various amounts of peroxide.

Examples 8a-c

A formulation was prepared using 450 g resin A, 50 g styrene, 5 g acetylacetone, 5 g K octanoate solution and 0.45 g Mn ethylhexanoate solution. This formulation was divided into 50 g portions, of which the cure was monitored in the gel timer using 3% (relative to primary resin system) of various peroxides (all are commercially available form Akzo Nobel Chemicals Inc) The results are shown in table 8.

TABLE 8

| Example | | Tgel (min) | T peak (min) | peak temp (° C.) |
|---|---|---|---|---|
| 8a | Butanox M-50 | 5.9 | 11.6 | 189 |
| 8b | Trigonox 44B | 11.6 | 58.7 | 84 |
| 8c | Cyclonox LE50 | 4.8 | 10 | 183 |

These results indicate that multiple peroxides can be employed. Moreover, they indicate that the cure can be adjusted using different peroxides.

Examples 9a-e

Formulations based of various commercial resins (from DSM Composite Resins, Schaffhausen, Switzerland) were prepared using 90 g resin, 10 g styrene, 0.09 g Mn ethylhexanoate solution, 0.5 g K octanoate solution, 0.5 g acetylacetone and 0.016 g t butyl catechol. Curing was monitored in the geltimer using 3% (relative to primary resin system) Butanox M-50 and the results are shown in table 9.

TABLE 9

| Ex | | Tgel (min) | T peak (min) | peak temp (° C.) |
|---|---|---|---|---|
| 9a | Palatal P 4-01 | 132.7 | 159 | 126 |
| 9b | Palatal P 5-01 | 41.6 | 58.1 | 150 |
| 9c | Palatal P 6-01 | 28.4 | 40.3 | 185 |
| 9d | Palatal P 69-02 | 33.7 | 43.8 | 179 |
| 9e | Synolite 8388-N-1 | 39.6 | 51.7 | 140 |

These results indicate that various unsaturated polyester resins including DCPD resins can be cured according to the invention. Moreover these results indicate that radical inhibitors can be used in combination with the cure system according to the invention.

Examples 10

The formulation of example 9b was prepared in a 200 g amount and divided into 2 portions of 100 g. The first portion was cured immediately after preparation using 3% (relative to primary resin system) Butanox M-50 resulting in a gel time of 132 min. The second portion was cured using 3% (relative to primary resin system) Butanox M-50 after 6 months and the gel time was 126 min. The gel time drift of this formulation was −5%.

For comparison example 10 was repeated with 0.4 g cobalt naphthenate (10% in spirits) instead of Mn ethyl hexanoate, K octanoate and acetyl acetone. This experiment resulted in a gel time drift of 201% after 6 months.

This result indicates that formulations with a low gel time drift tendency can be obtained.

Examples 11a-b

Cured objects (castings) were prepared by casting 500 g of a resin composition between borosilicate glass plates that was separated with a 4 mm EPDM U-shaped rim. The resin composition contains 500 g resin A, 2.5 g acetyl acetone, 2.5 g potassium-2-ethylhexanoate solution (10% K in ethanol, commercially available from Heybroek B.V., the Netherlands) and various amounts of Nuodex Mn 10 (10% Mn, commercially available from Elementis). Curing was performed with 2% (relative to primary resin system) Butanox M50. After release the castings were post-cured during 24 hrs at 60° C. and 24 hrs at 80° C. The results are shown in table 10.

Mechanical properties of the cured objects were determined according to ISO 527-2. The Heat Distortion Temperature (HDT) was measured according to ISO 75-Ae. Barcol hardness was measured according to DIN EN 59. Residual styrene contents were measured by gaschromatography using GC-FID (Gas Chromatography with a Flame Ionization Detector), using butylbenzene as an internal standard, after extraction of the cured objects in dichloromethane for 48 hrs.

TABLE 10

| Example | Mn (g) | HDT (° C.) | Tensile (MPa) | E-mod (Gpa) | Elongation at break (%) | rest styrene (%) | Barcol hardness |
|---|---|---|---|---|---|---|---|
| 11a | 1.5 | 73 | 58 | 3.6 | 1.8 | <0.1 | 44 |
| 11b | 0.15 | 71 | 77 | 3.7 | 3.1 | <0.1 | 45 |

These results clearly indicate that resins cured according to the invention are suitable for use in construction applications.

Examples 12a-d and Comparative Experiments H-I

Cured objects (castings) were prepared by casting 500 g of the initiated resin composition (see table below in which all amounts are in gram) between borosilicate glass plates that was separated with a 4 mm EPDM U-shaped rim. After 24 hrs at 20° C. the casting was post-cured for 16 hours at 40° C. Mechanical properties of the cured objects were determined according to ISO 527-2. The Heat Distortion Temperature (HDT) was measured according to ISO 75-Ae. Residual styrene and benzaldehyde contents were measured by gaschromatography using GC-FID (Gas Chromatography with a Flame Ionization Detector), using butylbenzene as an internal standard, after extraction of the cured objects in dichloromethane for 48 hrs.

TABLE 11

| | 12a | 12b | Comp. Ex. H | 12c | 12d | Comp. Ex. I |
|---|---|---|---|---|---|---|
| Resin | Palatal P4-01 | Palatal P4-01 | Palatal P4-01 | Synolite 8388-N-1 | Synolite 8388-N-1 | Synolite 8388-N-1 |
| Co solution (10% Co-2-ethylhexanoate; commercially available from Elementis) | | | 0.27 | | | 0.27 |
| Nuodex Mn-10 (10% Mn, commercially available from Elementis) | 0.83 | 1.48 | | 0.79 | 1.53 | |
| acetylacetone | 4.99 | 5.11 | | 5.1 | 5.0 | |
| K solution (10% K) | 5 | 5.01 | | 5.1 | 5.02 | |
| Butanox M50 | 10 | 10 | 10 | 10 | 10 | 10 |
| HDT (° C.) | 54.6 | 54.5 | 53.5 | 66.6 | 68 | 62 |
| Tens Str MPa | 60 | 60 | 70 | 49 | 43 | 63 |
| E-mod MPa | 3755 | 3666 | 4077 | 3805 | 3585 | 3645 |
| Elongation at break (%) | 1.8 | 1.9 | 2.0 | 1.4 | 1.2 | 2.1 |
| Residual styrene (%) | <0.01 | <0.01 | 1.2 | <0.01 | <0.01 | 1.75 |
| Residual benzaldehyde (%) | <0.01 | <0.01 | 0.07 | <0.01 | <0.01 | 0.07 |

These results clearly indicate that castings can be prepared with comparable or even better mechanical properties and surprisingly very low rest styrene and rest benzaldehyde amounts i.e. below the detection limit. This is very advantageous in view of lower emissions of these compounds to the environment.

The invention claimed is:
1. An unsaturated polyester resin composition comprising an unsaturated polyester resin, a manganese compound, a

1,3-dioxo compound, and a base, wherein the manganese compound is a manganese$^{2+}$ or manganese$_{3+}$ salt or complex, the manganese compound is present in an amount of at least 0.01 mmol manganese per kg of primary resin system, and wherein the base is an organic base with pK$_a$≧10 or the base is an alkali metal or earth alkaline metal compound, wherein the alkali earth or alkali metal compound is an oxide, hydroxide, carboxylate, carbonate or hydrocarbonate, and wherein the molar ratio between the 1,3-dioxo compound and a basic functionality of the base is from 170:1 to 1:30, and wherein the resin composition has a cobalt concentration of lower than 0.01 mmol Co per kg primary resin system, and the resin composition is curable with a peroxide, and wherein the 1,3-dioxo compound is a compound having the following formula:

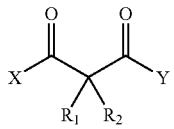

(1)

wherein,
- X and Y are individually H, $C_1$-$C_{20}$ alkyl, $C_6$-$C_{20}$ aryl, alkylaryl, arylalkyl, part of a polymer chain, OR$_3$, or NR$_3$R$_4$;
- R$_1$, R$_2$, R$_3$, and R$_4$ each individually represents hydrogen (H), or a $C_1$-$C_{20}$ alkyl, aryl, alkylaryl or arylalkyl group, and each optionally may contain one or more heteroatoms selected from the group consisting of oxygen atoms, phosphor atoms, nitrogen atoms, sulphur atoms and substituents thereof;
- a ring optionally may present between R$_1$ and R$_2$, R$_1$ and R$_3$, R$_2$ and R$_4$, or combinations thereof; and
- at least one of R$_3$ and R$_4$ may optionally be part of a polymer chain, attached to a polymer chain or contain a polymerizable group.

2. The resin composition according to claim 1, wherein the manganese compound is a manganese carboxylate or a manganese acetoacetate.

3. The resin composition according to claim 1, wherein at least one of X and Y is $C_1$-$C_{20}$ alkyl, $C_6$-$C_{20}$ aryl or combinations thereof.

4. The resin composition according to claim 1, wherein at least one of X and Y is a methyl group.

5. The resin composition according to claim 4, wherein the 1,3-dioxo compound is acetylacetone.

6. The resin composition according to claim 1, wherein the amount of the 1,3-dioxo compound is from 0.05 to 5% by weight, calculated on the total weight of the primary resin system of the resin composition.

7. The resin composition according to claim 1, wherein the organic base is a nitrogen containing compound.

8. The resin composition according to claim 7, wherein the nitrogen containing compound is an amine.

9. The resin composition according to claim 1, wherein the base is an alkaline metal or earth alkaline metal compound.

10. The resin composition according to claim 9, wherein the potassium compound is a potassium carboxylate.

11. The resin composition according to claim 1, wherein the base is present in an amount of from 0.001 to 2000 mmol/kg of primary resin system.

12. The resin composition according to claim 1, wherein a molar ratio between the manganese and the basic functionality of the base is from 3:1 to 1:1500.

13. The resin composition according to claim 1, wherein a molar ratio between the manganese and the dioxo compound is from 2:1 to 1:5000.

14. The resin composition according to claim 1, wherein the resin composition further comprises a radical inhibitor.

15. Cured objects and structural parts obtained from the resin composition according to claim 1, obtained by curing the resin composition with a peroxide.

16. A process for radically curing the resin composition according to claim 1, comprising adding a peroxide to the resin composition and curing the resin composition in the absence of cobalt.

17. The process according to claim 16, wherein the peroxide is at least one selected from the group consisting of hydroperoxides, perethers and perketones.

18. The process according to claim 17, wherein the peroxide is methylethylketone peroxide.

19. The resin composition according to claim 8, wherein the amine is a tertiary amine.

20. The resin composition according to claim 9, wherein the base is a potassium compound.

21. The resin composition according to claim 14, wherein the inhibitor is at least one selected from the group consisting of phenolic compounds, stable radicals, catechols and phenothiazines.

* * * * *